United States Patent [19]

Günter

[11] Patent Number: 4,786,434

[45] Date of Patent: Nov. 22, 1988

[54] AGENT FOR THE ELIMINATION OF ACTIVE CHLORINE COMPOUNDS FROM WATER

[75] Inventor: Ritter Günter, Melle, Fed. Rep. of Germany

[73] Assignee: Tetra Werke Dr. rer. nat. U. Baensch GmbH, Melle, Fed. Rep. of Germany

[21] Appl. No.: 153,385

[22] Filed: Feb. 8, 1988

[30] Foreign Application Priority Data

Feb. 12, 1987 [DE] Fed. Rep. of Germany ....... 3704295

[51] Int. Cl.[4] .............................................. C02F 5/12
[52] U.S. Cl. .................................... 252/181; 564/500; 568/425; 568/448; 568/492
[58] Field of Search ................. 252/181; 564/500; 568/425, 448, 492

[56] References Cited

U.S. PATENT DOCUMENTS 2,597,281  5/1952  Borstelmann et al. ................ 8/587

Primary Examiner—Robert A. Wax
Attorney, Agent, or Firm—Joan Thierstein

[57] ABSTRACT

An agent for and the method for its use in the elimination of active chlorine compounds from water comprises a hydroxysulfinate adduct of an aliphatic, aromatic, or heterocyclic mono- or dialdehyde or an ammonia adduct thereof. The agent is used alone or in combination with the corresponding aldehyde.

8 Claims, No Drawings

AGENT FOR THE ELIMINATION OF ACTIVE CHLORINE COMPOUNDS FROM WATER

BACKGROUND OF THE INVENTION

The present invention is concerned with a chemical agent for the rapid elimination of active chlorine compounds, especially chloramine, and for the simultaneous binding of ammonia and heavy metal ions in water supplies such as drinking water, or fresh or sea water used for the breeding and maintenance of aquatic animals in aquaria, ponds, streams, circulating systems and transport containers.

Especially in countries in warmer climates, there is increasing use of chloramine ($H_2NCl$) in place of chlorine, hypochlorites, chlorine dioxide and similar active chlorine compounds for the disinfection of drinking water to eliminate problems caused by micro-organisms. Thus, for example, in some of the United States, chloramine concentrations are used in the range of from 0.2 to 2.5 mg/liter.

These concentrations which are fully acceptable to humans prove, in the case of aquarium fish, to be initially toxic to highly toxic as shown by a comparison with the average toxicity data:

$LC_0 = 0.1$–$0.15$ mg/liter $H_2NCl$
$LC_{50} = 0.3$–$0.35$ mg/liter $H_2NCl$
$LC_{100} > 0.8$ mg/liter $H_2NCl$ Refilling an aquarium or even replacing the greater than 10% of the water in an aquarium with drinking water containing chloramine may prove fatal to all of the fish in the aquarium tank. The lethal, toxic action of chloramine in the water is seen usually within 5 to 30 minutes.

This situation is made more difficult by the fact that in many municipal waterworks rather than adding pure chloramine to the drinking water supply, sodium hypochlorite solution or chlorine are added together with ammonia. Chloramine is thus generated in situ according to the following equations:

$$Cl_2 + NH_3 \rightarrow H_2NCl + H^+ + Cl^-$$

as well as
$$HOCl + NH_3 \rightarrow H_2NCl + H_2O$$

Ammonia is frequently added to the drinking water supply in excess so that drinking water treated in this manner also contains ammonia as well as chloramine.

One known method for the removal of chloramine from water supplies is the reduction of chloramine by the action of sodium thiosulfate. However, the ammonia which is liberated from the reduction of the chloramine according to the equation:

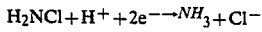
$$H_2NCl + H^+ + 2e^- \rightarrow NH_3 + Cl^-$$

chloramine reducer ammonia chloride cannot be bound by sodium thiosulfate. The removal of ammonia is also of great importance to aquarists and fish breeders since it is known that ammonia is also a strong fish poison. Therefore, when an agent such as sodium thiosulfate is used to treat chloramine, there is also the additional need to use an active agent such as zeolites to adsorb the ammonia. Heavy metals, on the other hand, can be bound by thiosulfate ions to give thiosulfate complexes, their toxicity thereby being reduced.

The sodium bisulfite adduct of formaldehyde, sodium hydroxymethylsulfonate, $Na^+HO\text{-}CH_2SO_3^-$, is another agent which is known for the reduction of chloramine and for binding ammonia.

Therefore it is an object of the present invention to provide agents which in a single step rapidly reduce chloramine, simultaneously bind ammonia, and are also capable of binding heavy metal ions in order to prepare drinking water, or fresh or sea water for the breeding and maintenance of aquatic animals in aquaria, ponds, streams, circulating systems, or transport containers.

SUMMARY OF THE INVENTION

Surprisingly, we have found in accordance with the present invention that compounds which can be formally regarded as being adducts of hydrogen sulfoxylate anions to aliphatic, aromatic, or heterocyclic mono- and dialdehydes, are exceptionally well suited for solving these problems. Furthermore, we have found that mixtures of these compounds with the corresponding aldehydes further increase the ammonia-binding capacity and result in an unexpected stabilization of the sulfinate solutions.

In addition, the adducts resulting from reaction with ammonia display a very high potential for binding heavy metal ions so that, in accordance with this aspect of the invention, the corresponding amino- imino- or nitrilosulfinates can also be used alone or in combination with the above-mentioned compounds.

Therefore, the present invention provides an agent for the preparation of water containing a hydroxysulfinate which can be regarded as an adduct of hydrogen sulfoxylate anions to an aliphatic, aromatic, or heterocyclic mono- or dialdehyde according to the following equation:

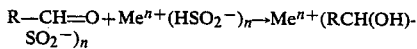
$$R\text{-}CH=O + Me^{n+}(HSO_2^-)_n \rightarrow Me^{n+}(RCH(OH)SO_2^-)_n$$

wherein $Me^{n+}$ is a mono-, di- or trivalent metal cation and, when $n=1$, may also be hydrogen ion. The agent may also be the corresponding amino-, imino-, or nitrilosulfinate either alone or in admixture with one another or in admixture with the corresponding aldehyde.

In another aspect, the present invention provides a method for preparing water, especially drinking water, fresh and sea water, for the breeding and maintenance of aquatic animals in aquaria, ponds and streams, circulatory systems and transport containers, to remove active chlorine compounds, ammonia, and heavy metal ions, which method comprises adding an agent as defined above to the water to be treated.

DETAILED DESCRIPTION

Theoretically, there can be produced from any known aliphatic, aromatic, or heterocyclic aldehyde the corresponding hydroxymethylsulfinates with a gradually differing but comparable reactivity toward chloramine and ammonia which can be used for the purpose of this invention.

Straight-chained or branched-chain aliphatic mono- or dialdehydes containing from one to five carbon atoms, furfuryl aldehyde, benzaldehyde, and salicaldehyde, and the cations hydrogen, sodium, potassium, magnesium, calcium, and aluminum are preferred.

Especially preferred are formaldehyde, and the corresponding hydrogen and sodium hydroxymethylsulfinate, aminomethylsulfinate, imino-di(methylsulfinate) and nitrilo-tri(methylsulfinate).

All of the above-mentioned pure compounds, derivatives and mixtures of these compounds are able, after introduction into contaminated aquarium water, fresh water, drinking water and transport water, to rapidly detoxify these waters within 1 or 2 minutes. This treatment completely reduces active chlorine compounds such as $OCl^-$, $Cl_2$, $HOCl$, organic N-chloro compounds, chlorine dioxide, and chloramine. Simultaneously, the treatment binds a preponderance (50% to 90%) of the ammonia or amines which are liberated by reaction of the treatment agent with the active chlorine compounds or ammonia already present in the water. Furthermore, the N-organylsulfinates formed by the reaction of ammonia with the treatment agent are especially capable of binding heavy metal ions by chelate formation, with retention of their redox properties. Hence, these compounds may also be present in water treatment compositions of the present invention, either alone or in combination, for certain applications.

The reactions which take place are exemplified below on the basis of the best-known and most readily available parent compound hydroxymethylsulfinic acid and its sodium salt, $(HO-CH_2-SO_2)^-Na^+$, known under the name of Rongalite, and formally described as being the hydrogen sulfoxylate of formaldehyde. However, in principle, these reactions can also be applied to any other hydroxymethyl sulfinate substituted in any desired manner on the methyl group. Thus, for example, the sulfoxylate adducts of acetaldehyde, butyraldehyde or benzaldehyde are also contemplated.

According to its redox properties, the hydroxymethylsulfinate anion reacts with chloramine in a molar ratio to 1:2 according to the following reaction:

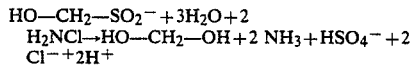
$HO-CH_2-SO_2^- + 3H_2O + 2$
$H_2NCl \rightarrow HO-CH_2-OH + 2\ NH_3 + HSO_4^- + 2$
$Cl^- + 2H^+$ This chloramine reduction proceeds to completion very quickly, usually in about 1 to 2 minutes with the production of two moles of ammonia and about 1 mole of formaldehyde which alone does not react further, or reacts only very slowly with further chloramine.

A part of the ammonia which is liberated by this reaction is reversibly bound by the liberated formaldehyde according to the equation:

$HO-CH_2-OH + NH_3 \rightarrow H_2N-CH_2-OH + H_2O$ and therafter further according to the equation:

$H_2N-CH_2-OH + NH_3 \rightarrow H_2N-CH_2-NH_2 + H_2O$

The hydroxymethylsulfinate anion reacts with ammonia, depending upon the mole ratio, to form the aminomethylsulfinate, $H_2N-CH_2-SO_2^-$, in the molar ration 1:1; imino-di(methylsulfinate), $NH(CH_2-SO_2^-)_2$, in the molar ratio of 2:2; and nitrilo-tri(methylsulfinate), $N(CH_2-SO_2^-)_3$, in the mole ratio of 1:3.

In the case of the molar ratio of 1:1, this reaction takes place with from 55% to 80% conversion; in the case of a molar ratio of 1:2 (100% hydroxymethylsulfinate excess), with approximately 72% to 92% conversion; and in the case of a molar ratio of 1:3, with approximately 87% to 96% conversion, referred to the ammonia used. The extent of reaction depends upon the electrolyte content of the water and upon the absolute ammonia concentration.

The adducts of the hydroxymethylsulfinate anion with ammonia, $H_2N-CH_2-SO_2^-$, $NH(CH_2-SO_2)_2^{2-}$, and $N(CH_2-SO_2)_3^{3-}$, give anions with a two-, three-, or four-figured ligand character. These chelate ligands can form chelate complexes with toxic heavy metals, for example with copper, zinc, cadmium and the like, and thereby result in a reduction of the toxicity of these heavy metals.

Since the above-described adduct formation from ammonia and hydroxyorganylsulfinates is reversible and the redox properties of the sulfinate group is scarcely affected thereby, the reactivity of the ammonia adducts towards chloramine is comparable with that of the free hydroxymethylsulfinate, and the ammonia adducts can therefore also be used for the reduction of chloramine, with somewhat diminished ammonia and heavy metal binding capacity. The heavy metal binding capacity of the imino- and nitrilomethylsulfinates is independent of the ammonia already present and, therefore, in comparison with the hydroxymethylsulfinates where the corresponding ammonia adducts must first be formed is more favorable.

These properties of the mentioned compounds and the mixtures thereof for use, in accordance with the present invention, for the preparation of water (especially in aquaria for the rapid and complete reduction of active chlorine compounds, particularly chloramine, and the simultaneous or independent covalent binding of ammonia and complexation of heavy metals) could not have been deduced from the previous use of this class of compounds in vat dyeing. The above-described reactions, which take place in the aquarium itself where concentrations of harmful chloramine, ammonia or heavy metals are very small, and the conversions rates are up to 100%, could not have been foreseen and are, therefore, believed to be surprising and unexpected.

Besides the trifunctional preparation of aquarium fresh and sea water described in detail above, all three preparation functions of the agents of this invention can be used in the following systems or types of waters: (a) all sport and edible fish maintenance systems (ponds, streams or circulatory plants with fresh and sea water) in the case of chloramine, ammonia and heavy metal problems; (b) addition to transport water for aquatic organisms for the detoxification of ammonia which is excreted by the organisms; (c) garden and culture ponds with a dense fish population, for ameliorating potential ammonia concentration peaks in the case of deficient nitrification and for the reduction of chloramine in the case of refilling and water exchange; (d) treatment of fresh tap water which is used for supplementing evaporated water in sea water aquaria; and (e) treatment of fresh water for and maintanance water in water turtle containers.

To illustrate the action of the above-mentioned compounds, there are provided in Table I the experimental results for fresh water and sea water compared with the reactivity of formaldehyde.

TABLE I

| Mole Ratio $NH_3$:A or B | Total Ammonia Reduction in Percent of Initial Concentration | | | | | |
|---|---|---|---|---|---|---|
| | Demineralized Water | | Tap Water | | Sea Water | |
| | A | B | A | B | A | B |
| 1:1 | 57 | 56 | 55 | 44 | 80 | 77 |

TABLE I-continued

| Mole Ratio | Total Ammonia Reduction in Percent of Initial Concentration | | | | | |
|---|---|---|---|---|---|---|
| | Demineralized Water | | Tap Water | | Sea Water | |
| NH$_3$:A or B | A | B | A | B | A | B |
| 1:2 | 77 | 76 | 72 | 72 | 92 | 94 |
| 1:3 | 89 | 89 | 87 | 83 | 96 | 96 |

A = Hydroxymethylsulfinate
B = Formaldehyde

In the case of all measurements, the total concentration of ammonia/ammonium ion was 180-200 μmol/liter, corresponding to 3.1 to 3.5 mg/liter ammonia and ammonium ions, corresponding to harmful concentration which can easily be achieved in stressed aquarium waters and fish transport waters.

The use of pure Rongalite or of sodium hydroxymethylsulfinate preferably takes place in solid form, for example as powder, pellets, tablets, capsules, or sachets, since it is very unstable in solution.

The colorless, crystalline product dissolves very quickly in aquarium water and immediately reacts in solution in the manner described above.

The concentrations used depend upon the existing or expected content of chloramine and/or ammonia and range between about 0.1 to 500 mg per liter, and preferably between about 1 to 10 mg per liter of water to be treated.

Typical concentrations for use are, for example, 3 mg/liter Rongalite for 2.5 mg/liter chloramine or about 6 mg/liter Rongalite for an additional and inclusive binding of liberated ammonia and/or ammonia already present.

As shown in Table I, aldehydes which are reactive with ammonia, for example formaldehyde, also possess the property of forming adducts with ammonia in dilute aqueous solutions.

Therefore, it is possible by the addition of the parent aldehyde, for example formaldehyde, to the Na$^+$-HO—CH$_2$SO$_2^-$ to increase the ammonia binding capacity of 1:1 at most for the hydroxymethylsulfinate to 1:2 or more and thus to equate to the reduction capacity for chloramine, 1:2.

The addition of the two components can take place separately, for example by the separate addition of crystalline Na$^+$HO—SO$_2^-$ and formaldehyde dissolved in water. However, this method has serious disadvantages. Surprisingly, we have found that both components, for example sodium hydroxymethylsulfinate and formaldehyde, combined in a single aqueous solution in a mole ratio of between about 1:1 to about 1:3, leads to an additional stabilization of the normally unstable solution of sodium hydroxymethylsulfinate alone. In addition, such solutions surprisingly prove to be stable for a long time.

It is assumed that the stabilizing effect of the aldehyde depends upon two factors: on the one hand, to a suppression of the hydrolysis of the sulfoxylate, and on the other hand to adduct formation with the aldehyde according to the equation:

$$HO-CH_2-SO_2^- + CH_2O + H^+ \rightarrow HO-CH_2-SO_2-CH_2-OH$$

to give bis-hydroxymethylsulfone. This class of compounds also reacts in a quite analogous fashion with chloramine.

The use and dosing of this combination takes place in a completely analogous fashion to the use and dosing of the pure hydroxymethylsulfinate where, for ammonia binding, the reduced ammonia binding capacity must also be taken into account.

The combination of hydroxymethylsulfinate and ammonia surprisingly also proves to be stable for a long period of time in aqeuous solution. The use of this agent shows, in comparison with the use of hydroxymethylsulfinate, Na$^+$HO—CH$_2$SO$_3^-$, a number of important differences.

A principal difference in the chemical behavior lies in the reactivity of the products resulting from the oxidation in the case of the reaction with chloramine:

(a) sodium hydroxymethylsulfonate: in the case of oxidation, the products are formaldehyde and sulfate ion which are inert with respect to further reaction with chloramine;

(b) sodium hydroxymethylsulfinate: in the case of oxidation, the sodium hydroxymethylsulfonate stage is first passed through which not only reacts further with chloramine, but also forms an adduct with ammonia.

In spite of the similar structure, in which the difference consists solely in the oxysulfur group, in practice there are observed considerable surprising and unexpected differences in the chemical reaction behavior. The following advantages illustrate those differences, comparing the advantages of sodium hydroxymethylsulfinate with sodium hydroxymethylsulfonate.

The reduction capacity of sodium hydroxymethylsulfinate towards chloramine and other active chlorine compounds is twice as great so that only half the dose is required thus resulting in half the stressing of the aquarium water. The rate of reaction of the chloramine reduction is substantially higher with sodium hydroxymethylsulfinate. With aldehydes, in solution, bis-aldehyde adducts (bis-(hydroxyorganylsulfones)) result which are stable for a long period of time so that the preparation, storage and use of solutions are possible. With ammonia, the formation of 2 to 4 valency imino- and nitrilo(methylsulfinates) takes place which, as chelate ligands, bind heavy metals thereby detoxifying the water.

The following Examples are given for the purpose of illustrating the present invention and of showing the effectiveness of the compositions of the present invention.

Reaction with Chloramine in Aquarium Waters Example 1. The action of each the following Rongalite compositions on aquarium water containing 5 mg/liter chloramine was investigated:

(a) Rongalite powder dosed by means of a measuring spoon: for 100 liters of aquarium water, 785 mg; for 10 U.S. gallons (37.85 liters), 300 mg; and for 250 U.S. gallons (946 liters), 7.440 g.

(b) Hard gelatin capsules: 300 mg for 10 U.S. gallons (37.85 liters) of aquarium water; and 785 mg for 100 liters of aquarium water.

(c) Sachets of paper, aluminum, PE with 7440 mg crystalline Rongalite for 250 U.S. gallons (946 liters) of water.

(d) Tablets (with tabletting adjuvants) with 300 mg crystalline Rongalite for 10 U.S. gallons (37.85 liters) of aquarium water.

(e) Aqueous solutions of Rongalite and formaldehyde in a ration of 1:1 with (1) 102 mmole/liter (15.7 g/liter) Rongalite and 102 mmole/liter (3.1 g/liter) formaldehyde with a capacity of 100 ml per 200 liters of water,
(2) 198 mmole/liter (30.5 g/liter) Rongalite and 198 mmole/liter (5.9 g/liter) formaldehyde with a capacity of 100 ml per 100 U.S. gallons (387.5 liter) of water,
(3) 965 mmole/liter Rongalite and 965 mmole/liter (29.0 g/liter) formaldehyde with a capacity of 500 ml per 2500 U.S. gallons ( 9688 liters) of water.

(f) Aqueous solutions of Rongalite and ammonia in a ratio of 1:1
(1) 102 mmole/liter (15.7 g/liter) Rongalite and 102 mmole/liter (1.7 g/liter) ammonia with a capacity of 100 ml per 200 liters of water,
(2) 198 mmole/liter (30.5 g/liter) Rongalite and 198 mmole/liter (3.4 g/liter) ammonia with a capacity of 100 ml per 100 U.S. gallons (387.5 liters) of water,
(3) 965 mmole/liter (148 g/liter) Rongalite and 965 mmole/liter (16.4 g/liter) ammonia with a capacity of 500 ml per 2500 U.S. gallons (9688 liters) of water.

(g) Aqueous solutions of Rongalite and ammonia in a ratio of 2:1:
(1) 102 mmole/liter (15.7 g/liter) Rongalite and 51 mmole/liter (0.87 g/liter) ammonia with a capacity of 100 ml per (200 liters) of water,
(2) 198 mmole/liter (30.5 g/liter) Rongalite and 99 mmole/liter (1.7 g/liter) ammonia with a capacity of 100 ml per 100 U.S. gallons (387.5 liters) of water,
(3) 965 mmole/liter (1485 g/liter) Rongalite and 483 mmole/liter (8.2 g/liter) ammonia with a capacity of 500 ml per 2500 U.S. gallons (9688 liters) of water.

(h) Aqueous solutions of Rongalite and ammonia in a ratio of 3:1:
(1) 102 mmole/liter (15.7 g/liter) Rongalite and 34 mmole/liter (0.58 g/liter) ammonia with a capacity of 100 ml per 200 liters of water,
(2) 198 mmole/liter (30.5 g/liter) Rongalite and 66 mmole/liter (1.1 g/liter) ammonia with a capacity of 100 ml per 100 U.S. gallons (387.5 liters) of water,
(3) 965 mmole/liter (148 g/liter) Rongalite and 322 mmole/liter (5.5 g/liter) ammonia with a capacity of 500 ml per 2500 U.S. gallons (9688 liters) of water.

(i) Rongalite in solid form according to compositions 1 to 4 with simultaneous addition of formaldehyde or ammonia in aqueous solution according to the amounts given in Examples 5 to 8.

The compositions described in Examples 1a to 1i were dissolved in the given amounts of aquarium water (not only fresh water but also artificial sea water) with a content of 5 mg/liter of chloramine and rapidly mixed. A test for chloramine, conducted after one minute, was negative in all cases.

Reaction with Ammonia in Aquarium Waters (Example 2). The action of Rongalite on aquarium water (fresh water and sea water) with an ammonia content at pH 6 to 9 was investigated. For this purpose, fresh and sea water were mixed with about 190 to 200 μmole/liter of ammonia (3.24 to 3.41 mg/liter of ammonia) and the residual content of non-bound ammonia was determined at pH 7.5 to pH 8.5 ninety minutes after addition of Rongalite in various stoichiometric ratios.
(a) 195 μmole/liter (30.1 mg/liter).
(b) 390 μmole/liter (60.1 mg/liter).
(c) 780 μmole/liter (120 mg/liter).

(Example 3) The action of equimolar amounts of Rongalite and formaldehyde solution on ammonia in fresh and sea water was investigated.

From a stock solution with a content of 100 mole/liter of Rongalite and 100 mmole/liter of formaldehyde, there were dosed into fresh and seas water samples with an ammonia content of 166 μmole/liter (2.83 mg/liter of ammonia), appropriate volumes for various reaction mole ratios:
(a) in the reaction mole ratio of ammonia to (Rongalite+formaldehyde)=1.1. That is, to 166 μmole/liter ammonia there were dosed 166 μmole/liter of the Rongalite-formaldehyde mixture (166 μmole/liter Rongalite and 166 μmole/liter formaldehyde),
(b) in the reaction mole ratio of 1:2, corresponding to 332 μmole/liter (3.33 ml/liter) Rongalite-formaldehyde,
(c) in the reaction mole ratio of 1:4, corresponding to 664 μmole/liter (6.65 ml/liter) Rongalite-formaldehyde,
(d) in the reaction mole ratio of 1:8, corrsponding to 1329 μmole/liter (13.3 ml/liter) Rongalite-formaldehyde.

The experimental results for fresh and sea water for Examples 2 and 3 are summarized in Table II.

TABLE II

| Experiment | Mole ratio of Ammonia:Rongalite/ Formaldehyde | Bound Ammonia (in % of the Initial Concentration) | |
| --- | --- | --- | --- |
| | | Fresh Water | Sea Water |
| 2a | 1:1 | 55% | 80% |
| 2b | 1:2 | 72% | 92% |
| 2c | 1:4 | 87% | 96% |
| 3a | 1:1 | 67.1% | 77% |
| 3b | 1:2 | 75.5% | 90.2% |
| 3c | 1:4 | 89.9% | 97.9% |
| 3d | 1:8 | 95.1% | 100% |

It can be seen from Table II that, depending upon the molar reaction ratio and the reaction medium with pure Rongalite and Rongalite/formaldehyie mixture, between 55% and 100% of the ammonia is bound.

I claim:
1. A composition for use in treating water to remove active chlorine compounds selected from
(a) a mixture comprising
an adduct of hydrogen sulfoxylate anions to an aliphatic, aromatic, or heterocyclic mono- or dialdehyde according to the equation:

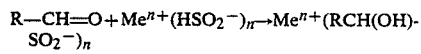
$$R-CH=O+Me^{n+}(HSO_2^-)_n \rightarrow Me^{n+}(RCH(OH)-SO_2^-)_n$$

wherein Me+ is hydrogen ion or a mono-, di- or trivalent metal cation, and
the corresponding amino-, imino-, or nitrilosulfinate formed as a product of said adduct with ammonia;
(b) a mixture comprising
said adduct, and
the corresponding parent aldehyde;
(c) a mixture comprising said adduct, and
ammonia.

2. A composition for use in treating water as defined in claim 1 wherein said adduct is the product of the reaction of hydrogen sulfoxylate anion with a straight or branched alipahtic mono- or dialdehyde of from one to five carbon atoms, furfuryl aldehyde, benzaldehyde, or salicaldehyde, and cations selected from hydrogen ion, sodium ion, potassium ion, magnesium ion, calcium ion, or aluminum ion.

3. A composition for use in treating water as defined in claim 2 wherein said adduct contains one or more anions from the group consisting of hydroxymethylsulfinate, aminomethylsulfinate, imino-di(methylsulfinate) or nitrilo-tri(methylsulfinate) and, as cation, hydrogen or sodium.

4. A composition for use in treating water as defined in claim 2 wherein said adduct contains one or more anions from the group consisting of hydroxymethylsulfinate, aminomethylsulfinate, imino-di(methylsulfinate) or nitrilo-tri(methylsulfinate) and, as cation, hydrogen or sodium; alone or in combination with formaldehyde.

5. A composition for use in treating water as defined in claim 2 wherein said adduct contains one or more anions from the group consisting of hydroxymethylsulfinate, aminomethylsulfinate, imino-di(methylsulfinate) or nitrilo-tri(methylsulfinate) and, as cation, hydrogen or sodium; alone or in combination with ammonia.

6. A composition for use in treating water as defined in claim 1 containing sodium hydroxymethylsulfinate.

7. A composition for use in treating water as defined in claim 4 containing sodium hydroxymethylsulfinate and formaldehyde in aqueous solution in a molar ration of from 1:1 to 1:3.

8. A composition for use in treating water as defined in claim 5 containing sodium hydroxymethylsulfinate and ammonia in aqueous solution in a molar ration of from 1:1 to 1:3.

* * * * *